US012717103B2

(12) United States Patent
Hashimoto et al.

(10) Patent No.: US 12,717,103 B2
(45) Date of Patent: Aug. 25, 2026

(54) OPTICAL FIBER CABLE

(71) Applicants: SUMITOMO ELECTRIC INDUSTRIES, LTD., Osaka (JP); NTT, Inc., Tokyo (JP)

(72) Inventors: Yutaka Hashimoto, Osaka (JP); Fumiaki Sato, Osaka (JP); Masashi Kikuchi, Tokyo (JP); Soichi Ishikawa, Musashino (JP); Akira Sakurai, Musashino (JP); Yusuke Yamada, Musashino (JP); Sadaharu Homan, Musashino (JP)

(73) Assignees: SUMITOMO ELECTRIC INDUSTRIES, LTD., Osaka (JP); NTT, INC, Tokyo (JP)

( * ) Notice: Subject to any disclaimer, the term of this patent is extended or adjusted under 35 U.S.C. 154(b) by 275 days.

(21) Appl. No.: 18/579,737

(22) PCT Filed: Aug. 24, 2022

(86) PCT No.: PCT/JP2022/031907
§ 371 (c)(1),
(2) Date: Jan. 16, 2024

(87) PCT Pub. No.: WO2023/027117
PCT Pub. Date: Mar. 2, 2023

(65) Prior Publication Data

US 2024/0329345 A1 Oct. 3, 2024

(30) Foreign Application Priority Data

Aug. 25, 2021 (JP) ................................. 2021-137057

(51) Int. Cl.
*G02B 6/44* (2006.01)
*G02B 6/02* (2006.01)

(52) U.S. Cl.
CPC ....... *G02B 6/4403* (2013.01); *G02B 6/02019* (2013.01); *G02B 6/02395* (2013.01)

(58) Field of Classification Search
CPC .................................................... G02B 6/4403
See application file for complete search history.

(56) References Cited

U.S. PATENT DOCUMENTS 7,936,957 B1 * 5/2011 Puzan .................. G02B 6/4494 385/112
2016/0291278 A1 10/2016 Yamamoto et al.
(Continued)

FOREIGN PATENT DOCUMENTS

EP 4 246 195 A1 9/2023
JP 2003-232972 A 8/2003
(Continued)

OTHER PUBLICATIONS

International Search Report dated Oct. 25, 2022 issued in PCT/JP2022/031907.
Written Opinion dated Oct. 25, 2022 issued in PCT/JP2022/031907.

*Primary Examiner* — Lisa M Caputo
(74) *Attorney, Agent, or Firm* — McDonald Hopkins LLC

(57) ABSTRACT

A core portion of each of optical fibers of an optical fiber cable is made of pure silica glass, an effective cross-sectional area of the core portion at a wavelength of 1550 nm is 110 $\mu m^2$ or more and 150 $\mu m^2$ or less. The optical fibers include an intermittent connection portion in which a connection portion to which an adhesive resin is applied and a non-connection portion to which the adhesive resin is not applied are alternately provided between adjacent optical fibers. The optical fiber ribbon has a ratio of a total adhesion length to which the adhesive resin is applied to a total length between all the optical fibers of 40% or more per a unit length of the optical fiber ribbon, and an occupancy ratio of
(Continued)

the optical fiber ribbon to a cross-sectional area of the internal space is 30% or more and 40% or less.

4 Claims, 5 Drawing Sheets

(56) References Cited

U.S. PATENT DOCUMENTS

| | | | |
|---|---|---|---|
| 2017/0031088 | A1 | 2/2017 | Yamamoto et al. |
| 2017/0031122 | A1 | 2/2017 | Yamamoto et al. |
| 2018/0314020 | A1 | 11/2018 | Sato et al. |
| 2019/0011656 | A1 | 1/2019 | Sato et al. |
| 2019/0049681 | A1 | 2/2019 | Bookbinder et al. |
| 2020/0041739 | A1 | 2/2020 | Sato et al. |
| 2020/0183111 | A1 | 6/2020 | Sato et al. |
| 2021/0325624 | A1 | 10/2021 | Yamaguchi et al. |

FOREIGN PATENT DOCUMENTS

| | | | |
|---|---|---|---|
| JP | 2014-211511 | A | 11/2014 |
| JP | 2016-194652 | A | 11/2016 |
| JP | 2017-032749 | A | 2/2017 |
| JP | 2017-125932 | A | 7/2017 |
| JP | 2017-223730 | A | 12/2017 |
| WO | 2018-174004 | A1 | 9/2018 |
| WO | 2020-045372 | A1 | 3/2020 |
| WO | 2022-102666 | A1 | 5/2022 |

* cited by examiner

OPTICAL FIBER CABLE

TECHNICAL FIELD

The present disclosure relates to an optical fiber cable.

The present application is based on Japanese Patent Application No. 2021-137057 filed on Aug. 25, 2021, the entire contents of which are incorporated herein by reference.

BACKGROUND ART

Patent Literature 1 describes an optical fiber cable in which an optical fiber ribbon is accommodated in an SZ twisted slot rod. In the optical fiber cable, in order to reduce a diameter of an optical fiber cable in a state where good transmission characteristics are ensured without increasing the loss, the optical fiber ribbon is intermittently formed with connection portions and non-connection portions in a longitudinal direction between adjacent optical fibers. Further, an occupancy ratio of the optical fiber ribbon calculated from a cross-sectional area of the optical fiber ribbon with respect to a cross-sectional area of a slot groove is 35% or more and 60% or less.

An optical fiber cable in which optical fiber ribbons are accommodated in a slot rod having a plurality of slot grooves is disclosed in Patent Literature 2. In the optical fiber cable, in order to mount optical fibers at high density, an outer diameter dimension of the optical fiber is 0.22 mm or less, and the optical fiber ribbon is intermittently formed with connection portions and non-connection portions in a longitudinal direction between the adjacent optical fibers. A density of the numbers of fibers of the optical fibers is 4.8 fiber/mm$^2$ or more in a cross section of the optical fiber cable.

Patent Literature 3 discloses an optical fiber cable that accommodates an optical unit in which optical fiber ribbons composed of a plurality of optical fibers are collected in a slot rod having a plurality of grooves. In the optical fiber cable, the optical unit is accommodated in the groove in a twisted state in order to prevent occurrence of macro bend loss even when the optical fiber ribbons are mounted in the groove at high density. Further, an occupancy ratio of the optical unit calculated from a cross-sectional area of the optical unit with respect to a cross-sectional area of the groove is 25% or more and 60% or less.

CITATION LIST

Patent Literature

Patent Literature 1: JP2014-211511A
Patent Literature 2: JP2017-223730A
Patent Literature 3: JP2017-32749A

SUMMARY OF INVENTION

Solution to Problem

An optical fiber cable according to an aspect of the present disclosure is an optical fiber cable in which an optical fiber ribbon formed by arranging a plurality of optical fibers in parallel is mounted in an internal space, in which a core portion of the optical fiber is made of pure silica glass, and an effective cross-sectional area of the core portion at a wavelength of 1550 nm is 110 $\mu m^2$ or more and 150 $\mu m^2$ or less, the optical fibers constitute an intermittent connection type optical fiber ribbon including an intermittent connection portion in which a connection portion to which an adhesive resin is applied and a non-connection portion to which the adhesive resin is not applied are alternately provided between adjacent optical fibers, the optical fiber ribbon has a ratio of a total adhesion length to which the adhesive resin is applied to a total length between all the optical fibers of 40% or more per a unit length of the optical fiber ribbon, and an occupancy ratio of the optical fiber ribbon to a cross-sectional area of the internal space is 30% or more and 40% or less.

DESCRIPTION OF EMBODIMENTS

Problem to be Solved by Present Disclosure

In order to cope with an increase in signal capacity due to a shift to a next generation mobile communication system or an increase in video information, there is an increasing need for an optical fiber cable capable of efficient signal transmission. In order to meet such needs, there is room for improvement in the configuration of the optical fiber cable as disclosed in Patent Literatures 1 to 3. In particular, in order to input a high-output optical signal, it is desirable to increase an effective cross-sectional area of an optical fiber, but when a density of the optical fiber having a large effective cross-sectional area is increased, the loss is likely to increase.

ADVANTAGEOUS EFFECTS OF DISCLOSURE

Figure 1:
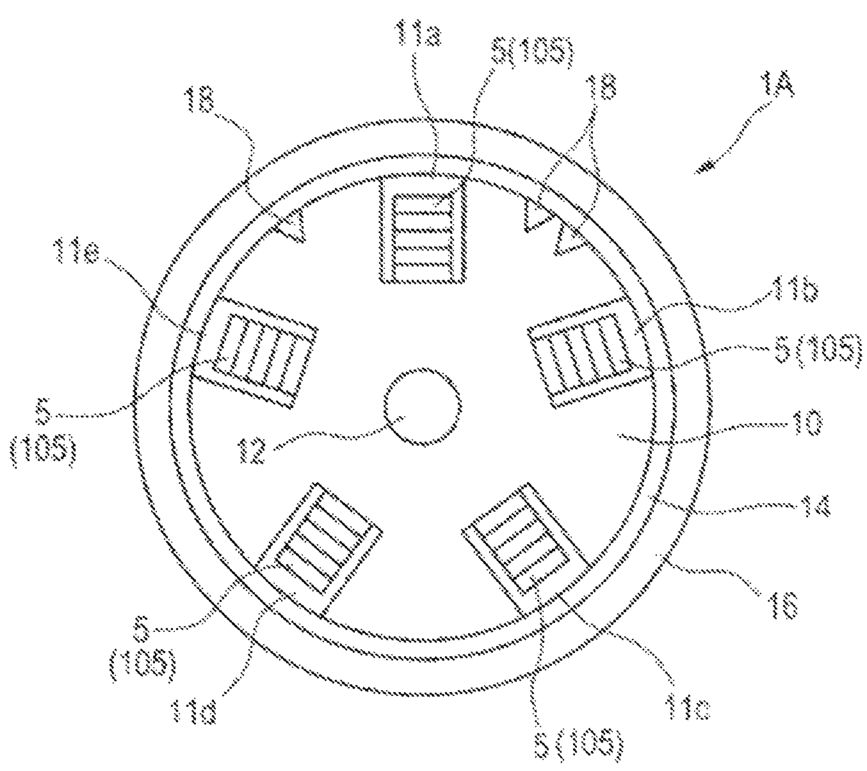
FIG. 1 is a cross-sectional view illustrating an optical fiber cable according to a first embodiment.

According to the present disclosure, it is possible to provide an optical fiber cable capable of preventing transmission loss, inputting a high-output optical signal, and accommodating an optical fiber ribbon with high density.

DESCRIPTION OF EMBODIMENTS OF PRESENT DISCLOSURE

First, embodiments of the present disclosure will be listed and described.

(1) An optical fiber cable according to an aspect of the present disclosure is an optical fiber cable in which an optical fiber ribbon formed by arranging a plurality of optical fibers in parallel is mounted in an internal space, in which a core portion of the optical fiber is made of pure silica glass, and an effective cross-sectional area of the core portion at a wavelength of 1550 nm is 110 $\mu m^2$ or more and 150 $\mu m^2$ or less, the optical fibers constitute an intermittent connection type optical fiber ribbon including an intermittent connection portion in which a connection portion to which an adhesive resin is applied and a non-connection portion to which the adhesive resin is not applied are alternately provided between adjacent optical fibers, the optical fiber ribbon has a ratio of a total adhesion length to which the adhesive resin is applied to a total length between all the optical fibers of 40% or more per a unit length of the optical fiber ribbon, and an occupancy ratio of the optical fiber ribbon to a cross-sectional area of the internal space is 30% or more and 40% or less.

According to this configuration, since the effective cross-sectional area of the core portion is 110 $\mu m^2$ or more and 150 $\mu m^2$ or less, a high-output optical signal can be input, the occupancy ratio which is a ratio of the cross-sectional area of the optical fiber ribbon mounted with respect to the cross-sectional area of the internal space is 30% or more and 40% or less, and therefore the optical fiber ribbon can be accommodated with high density. Further, per the unit length of the optical fiber, since the ratio of the adhesion length to which the adhesive resin is applied to the total length between all the optical fibers is 40% or more, a bending rigidity of the optical fiber ribbon is increased, and the optical fiber is less likely to buckle even when bending stress is applied to the cable. Accordingly, it is possible to realize an optical fiber cable in which transmission loss is prevented to be low.

Noted that the pure silica glass refers to silica glass containing no dopant, but may contain some impurities as long as the impurities do not affect the characteristics.

(2) In the optical fiber cable according to an aspect of the present disclosure, the intermittent connection portion may be provided for every two fibers in the optical fiber ribbon.

Since the intermittent connection portion is provided for every two fibers in the optical fiber ribbon, the non-connection portion is also provided for every two fibers. At this time, since the bending rigidity of the optical fiber ribbon is increased, the optical fiber is less likely to buckle even when bending stress is applied to the cable. Accordingly, it is possible to realize an optical fiber cable with further reduced transmission loss.

(3) In the optical fiber cable according to (1) or (2), per the unit length of the optical fiber ribbon, a ratio of the total adhesion length to which the adhesive resin is applied to the total length between all the optical fibers may be 73% or more.

According to this configuration, since per the unit length of the optical fiber ribbon, the ratio of the total adhesion length to which the adhesive resin is applied to the total length between all the optical fibers is 73% or more, the bending rigidity of the optical fiber ribbon is further increased, the buckling of the optical fiber can be further reduced even when bending stress is applied to the cable, and therefore the optical fiber cable in which the transmission loss is further reduced can be realized.

(4) The optical fiber cable according to any one of (1) to (3) may be a ribbon slot type optical fiber cable having a slot rod.

According to this configuration, it is possible to realize a cable capable of preventing transmission loss, inputting a high-output optical signal, and accommodating an optical fiber ribbon with high density in the ribbon slot type optical fiber cable.

(5) The optical fiber cable according to any one of (1) to (3) may be a slotless type optical fiber cable including a cable core formed by twisting a plurality of the optical fiber ribbons and a cable jacket provided around the cable core.

According to this configuration, since no slot rod is provided, it is possible to realize a cable having a smaller diameter and a lighter weight even when the same number of fibers as those of the ribbon slot type optical fiber cable is accommodated.

Details of Embodiments of Present Disclosure

A specific example of an optical fiber cable according to an embodiment of the present disclosure will be described below with reference to the drawings. Noted that the present disclosure is not limited to the following examples, but is indicated by the claims, and is intended to include all changes within the meaning and scope equivalent to the claims.

First Embodiment

FIG. 1 is a cross-sectional view of an optical fiber cable 1A according to a first embodiment.

As illustrated in FIG. 1, the optical fiber cable 1A is a ribbon slot type optical fiber cable, and includes a slot rod 10, a tension member 12 embedded in a central portion of the slot rod 10, a press-wrapping tape 14 wound around the slot rod 10, and a jacket 16 covering the press-wrapping tape 14. A plurality of (five in this example) slot grooves 11 (11*a* to 11*e*: an example of an internal space) capable of accommodating optical fiber ribbons 5 are formed in the slot rod 10. A position identification mark 18 for identifying a position of the slot groove 11 is provided on an outer periphery of the slot rod 10. In the first embodiment, the internal space corresponds to five slot grooves 11.

The slot rod 10 is an elongated body having a substantially circular cross section. The slot groove 11 is formed in a spiral shape along the longitudinal direction on an outer peripheral surface of the slot rod 10. A spiral shape of the slot groove 11 may be a spiral shape in one direction, or may be an SZ shape periodically inverted. The optical fiber cable 1A illustrated in FIG. 1 illustrates a 100-fiber ribbon slot type cable in which five optical fiber ribbons 5 with four fibers are stacked and accommodated in each of the slot grooves 11*a* to 11*e*. The optical fiber ribbon 5 may be, for example, twisted at a twist pitch equal to a spiral pitch of the slot groove 11 and twisted in accordance with a twist direction of the slot groove 11 while being accommodated in the slot groove 11. The optical fiber ribbon 5 will be described in detail later.

In the optical fiber cable 1A illustrated in FIG. 1, a shape of the slot groove 11 is formed in a rectangular shape, but is not limited thereto. The slot groove 11 may be formed in a U-shape, for example. An accommodation form of the optical fiber ribbon 5 accommodated in the slot groove 11 is not limited to a form in which a plurality of optical fiber ribbons are stacked. For example, the optical fiber ribbon 5 may be rolled so as to be bent in a width direction, that is, in a direction in which the optical fibers are arranged in parallel, and further a plurality of optical fiber ribbons may be accommodated. The number of optical fibers constituting the optical fiber ribbon is not limited to four as long as it is plural.

Figure 2:
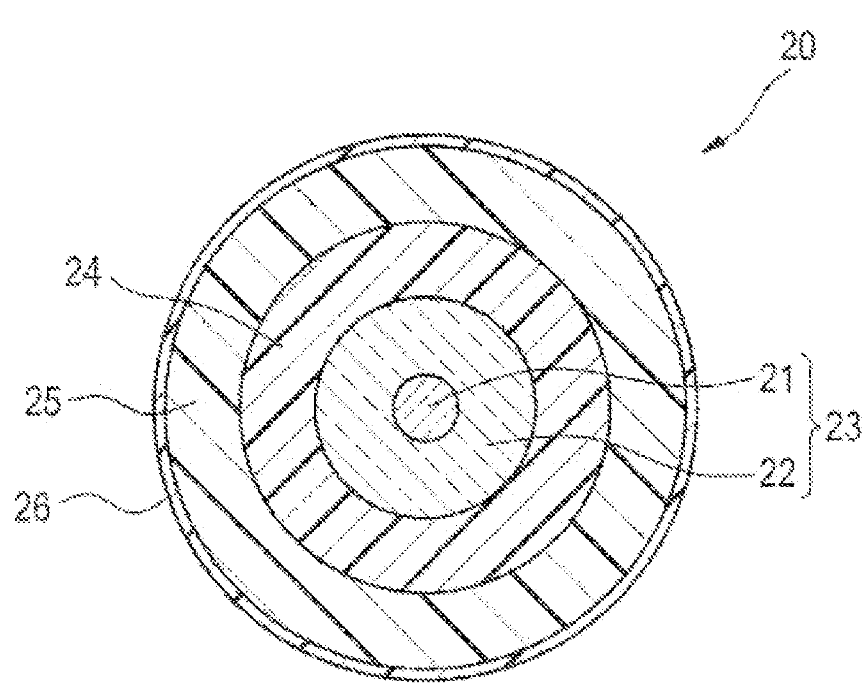
FIG. 2 is a cross-sectional view of an optical fiber accommodated in the optical fiber cable illustrated in FIG. 1.

FIG. 2 is a cross-sectional view of an optical fiber 20 constituting the optical fiber ribbon 5.

As illustrated in FIG. 2, the optical fiber 20 includes a glass fiber 23 including a core portion 21 having a refractive index higher than that of surrounding glass and a cladding portion 22 surrounding the core portion 21, two coating layers 24 and 25 covering a periphery of the glass fiber 23, and a colored layer 26 covering a periphery of the coating layer 25. The primary coating layer 24 on an inner side of the two coating layers is formed of a cured product of a primary resin. The secondary coating layer 25 on an outer side of the two coating layers is formed of a cured product of a secondary resin.

In the glass fiber 23, the core portion 21 is provided in a central portion, and the cladding portion 22 is provided to cover a periphery of the core portion 21. The core portion 21 is made of pure silica glass containing no additive. The core portion 21 is formed so that an effective cross-sectional area (Aeff) at a wavelength of 1550 nm is 110 $\mu m^2$ or more and 150 $\mu m^2$ or less.

A soft resin having a relatively low Young's modulus as a buffer layer is used as the primary resin constituting the primary coating layer 24 on the inner side in contact with the glass fiber 23. A hard resin having a relatively high Young's modulus as a protective layer is used as the secondary resin constituting the secondary coating layer 25 on the outer side. The Young's modulus of the cured product of the primary resin at a normal temperature (for example, 23° C.) is 1.0 MPa or less, preferably 0.7 MPa or less. The Young's modulus of the cured product of the secondary resin at a normal temperature (for example, 23° C.) is 900 MPa or more, preferably 1000 MPa or more, and more preferably 1500 MPa or more. An outer diameter of the optical fiber 20 is formed to be, for example, 220 μm or less.

In the optical fiber cable 1A having such a configuration, an occupancy ratio which is a ratio of the sum of cross-sectional areas of the optical fiber ribbons 5 accommodated in the slot grooves 11*a* to 11*e* (the total cross-sectional area of the optical fiber ribbons 5) to the sum of cross-sectional areas of the slot grooves 11*a* to 11*e* is designed to be 30% or more and 40% or less. When the cross-sectional area of the slot groove and the number of the optical fiber ribbons accommodated in the slot groove are equal in the slot grooves, the occupancy ratio of the total cross-sectional area of the optical fiber ribbons 5 is "the total cross-sectional area of the optical fiber ribbons accommodated in each slot groove"/"the cross-sectional area of each slot groove".

(One-Fiber Intermittent Connection Type Optical Fiber Ribbon)

Figure 3:
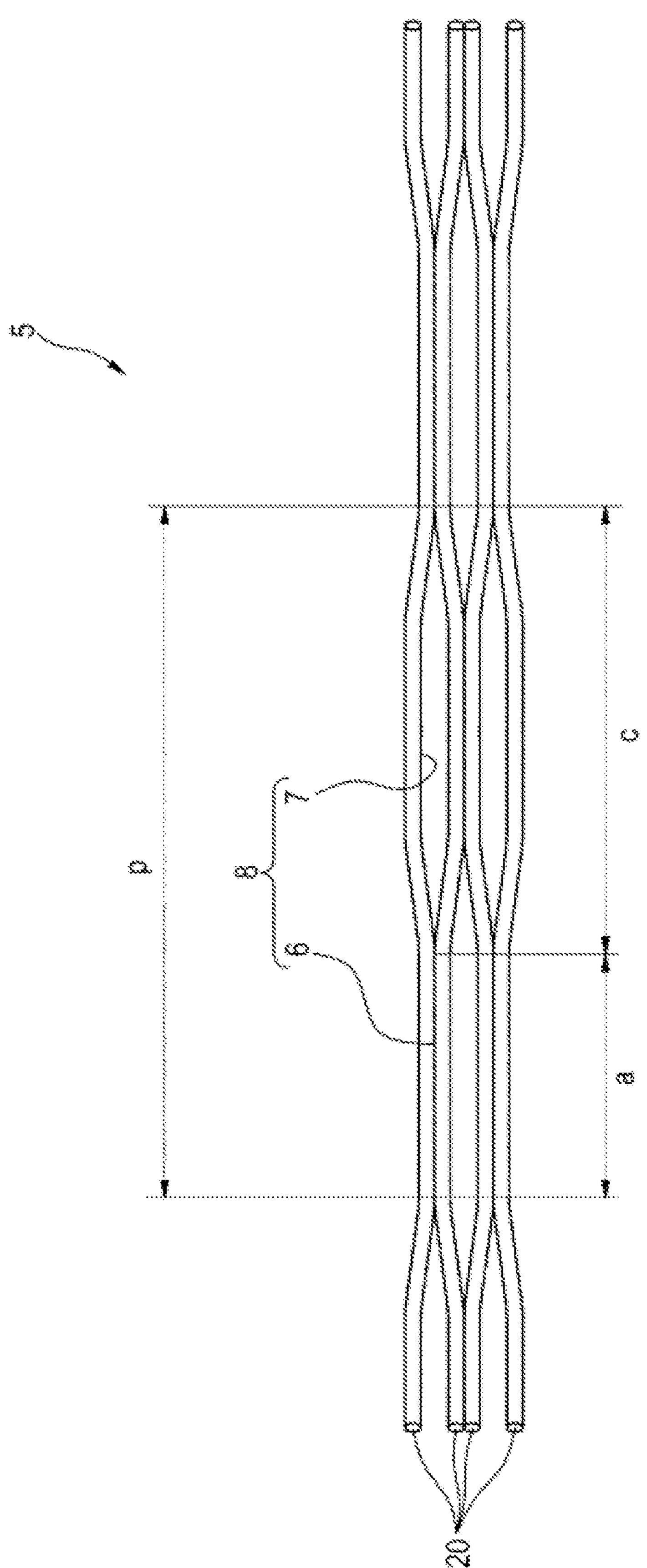
FIG. 3 is a plan view of a one-fiber intermittent connection type optical fiber ribbon accommodated in the optical fiber cable.

Next, the optical fiber ribbon 5 according to the present embodiment will be described. FIG. 3 is a plan view of the optical fiber ribbon 5 accommodated in the optical fiber cable 1A (see FIG. 1). FIG. 3 illustrates the optical fiber ribbon 5 in a state where the optical fibers 20 are opened in an arrangement direction.

As illustrated in FIG. 3, the optical fiber ribbon 5 has an intermittent connection portion 8 in which, in a state where four optical fibers 20 are arranged in parallel, a connection portion 6 in which adjacent optical fibers 20 are connected by an adhesive resin and a non-connection portion 7 in which adjacent optical fibers 20 are not connected are alternately and repeatedly provided in a longitudinal direction. The intermittent connection portion 8 is provided between the adjacent optical fibers 20, and therefore the optical fiber ribbon 5 is a one-fiber intermittent connection type optical fiber ribbon.

Here, with reference to FIG. 3, an adhesion length ratio of one-fiber intermittent connection type optical fiber ribbon in which n (n=4 in FIG. 3) optical fibers are arranged in parallel will be described. The adhesion length ratio is a ratio of a total adhesion length to which the adhesive resin is applied to a total length between all the optical fibers per unit length of the optical fiber ribbon.

A length (pitch p) of the intermittent connection portion 8 obtained by adding one connection portion 6 and one non-connection portion 7 together is defined as a unit length of the optical fiber ribbon 5. When a length of one connection portion 6 is a and a length of one non-connection portion 7 is c, the pitch p=a+c. At this time, since the n optical fibers are arranged in parallel, the total length between all the optical fibers corresponding to the unit length of the optical fiber ribbon 5 is represented by $(n-1)\times p$.

The total adhesion lengths to which the adhesive resin is applied is expressed as $(n-1)\times a$ since (n−1) connection portions (adhesion length a) are provided.

Accordingly, the adhesion length ratio is $\{(n-1)\times a\}/\{(n-1)\times p\}=a/p$.

(Two-Fiber Intermittent Connection Type Optical Fiber Ribbon)

Figure 4:
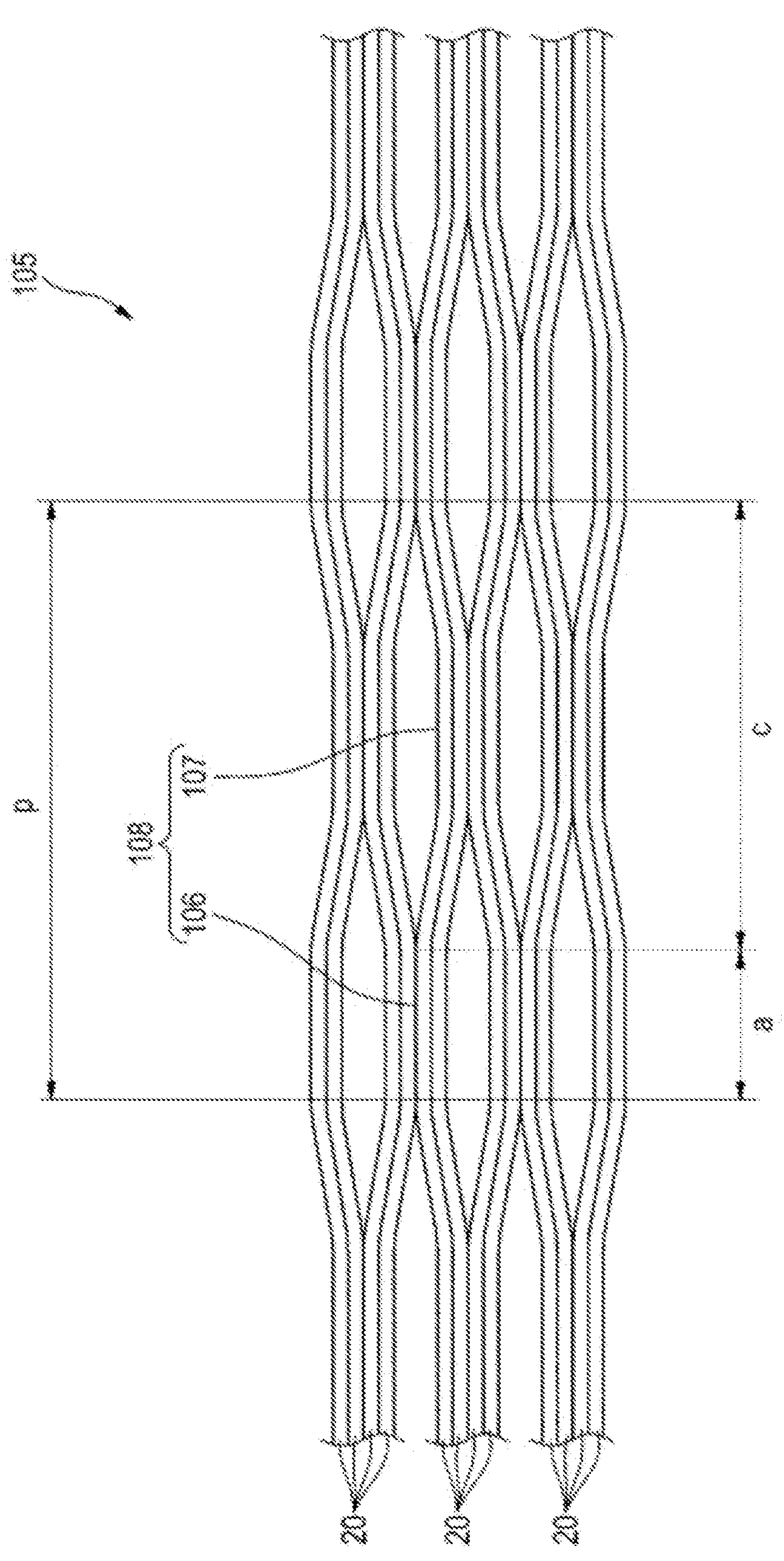
FIG. 4 is a plan view of a two-fiber intermittent connection type optical fiber ribbon accommodated in the optical fiber cable.

Next, another example of the optical fiber ribbon 5 will be described. FIG. 4 is a plan view of an optical fiber ribbon 105 accommodated in the optical fiber cable 1A (see FIG. 1). FIG. 4 illustrates the optical fiber ribbon 105 in a state where the optical fibers 20 are opened in the arrangement direction.

As illustrated in FIG. 4, in the optical fiber ribbon 105, in a state where four optical fibers 20 are arranged in parallel, adjacent optical fibers 20 to which the intermittent connection portion is not provided and that are entirely bonded by the adhesive resin and adjacent optical fibers 20 having the intermittent connection portion 108 are alternately repeated for every two fibers. The intermittent connection portion 108 is provided for every two fibers, and therefore the optical fiber ribbon 105 is a two-fiber intermittent connection type optical fiber ribbon.

Here, with reference to FIG. 4, the two-fiber intermittent connection type optical fiber ribbon in which n optical fibers are arranged in parallel will be described with respect to a ratio of the total adhesion length to which the adhesive resin is applied to the total length between all the optical fibers per unit length of the optical fiber ribbon (n=12 in FIG. 4).

A length (pitch p) of the intermittent connection portion 108 obtained by adding one connection portion 106 and one non-connection portion 107 of the optical fiber ribbon is defined as a unit length of the optical fiber ribbon 105. At this time, since the n optical fibers 20 are arranged in parallel, the total length between all the optical fibers 20 corresponding to the unit length of the optical fiber ribbon 105 is represented by $(n-1)\times p$.

The total adhesion lengths to which the adhesive resin is applied is calculated by subtracting the sum of the non-connection portions (non-adhesion length c) from $(n-1)\times p$ which is the total length between all the optical fibers. Since (n/2−1) non-connection portions are provided, the total adhesion lengths is expressed as $(n-1)\times p-(n/2-1)\times c$.

The adhesion length ratio is $\{(n-1)\times p-(n/2-1)\times c\}/\{(n-1)\times p\}$.

In both of the one-fiber intermittent connection type optical fiber ribbon 5 and the two-fiber intermittent connection type optical fiber ribbon 105 according to the present embodiment, the ratio of the total adhesion length to which the adhesive resin is applied to the total length between all the optical fibers is 40% or more.

In recent years, for example, in order to cope with an increase in capacity of a backbone system due to a shift to a fifth generation mobile communication system (5G) or an increase in video information, needs for an optical fiber cable capable of efficiently transmitting a signal have increased. In addition, the optical fiber cable is usually required to have a reduced diameter and a reduced weight from a viewpoint of ensuring a pipe line space and convenience at the time of installation. However, when the occupancy ratio of the optical fiber ribbon (the cross-sectional area of the ribbon/a cross-sectional area of a slot groove in a case of a slot type cable, and the cross-sectional area of the ribbon/an inner cross-sectional area of the jacket in a case of a slotless type cable) is excessively increased in order to meet the diameter reduction, the optical fiber ribbon cannot freely move in the slot groove or the jacket, and micro bend loss and macro bend loss increase due to an external pressure received from a side wall. Therefore, in order to ensure good transmission characteristics, it is necessary to keep the occupancy ratio of the optical fiber ribbon within a predetermined range.

In the optical fiber cable 1A according to the present embodiment, the core portion 21 of the optical fiber 20 is made of pure silica glass, and the effective cross-sectional area of the core portion 21 is 110 $\mu m^2$ or more and 150 $\mu m^2$ or less. Since the core portion 21 of the optical fiber 20 is made of pure silica glass containing no additive, an increase in transmission loss can be prevented as compared with a normal optical fiber in which germanium is doped. In addition, by increasing the effective cross-sectional area of the core portion in the optical fiber 20 to 110 $\mu m^2$ or more and 150 $\mu m^2$ or less, a power density of an input optical signal can be reduced, and the distortion of the signal waveform during transmission can be simplified (the distortion is not complicated).

The occupancy ratio of the optical fiber ribbons 5 and 105 with respect to the slot grooves 11 calculated by a ratio of the cross-sectional area of the slot grooves 11 (internal spaces) to the cross-sectional area of the optical fiber ribbons 5 and 105 is 30% or more and 40% or less. As the effective cross-sectional area increases, the loss tends to increase, but when the occupancy ratio is 40% or less, the loss does not increase so much. That is, by setting the occupancy ratio of the optical fiber ribbons 5 and 105 with respect to the slot grooves 11 to 40% or less, the optical fibers 20 are allowed to freely move to some extent in the slot grooves 11, and therefore for example, an external pressure or the like received from the side wall of the slot grooves 11 when the optical fiber cable 1A is bent is reduced, and occurrence of bending loss (micro bend loss or macro bend loss) can be prevented. In addition, by setting the occupancy ratio to 30% or more, high-density mounting of the optical fiber ribbons 5 and 105 can be ensured. Therefore, by setting the occupancy ratio of the optical fiber ribbons 5 and 105 with respect to the slot grooves 11 to 30% or more and 40% or less, the optical fiber ribbons 5 and 105 can be accommodated with high density while maintaining good transmission characteristics even when the effective cross-sectional area of the core portion 21 is increased.

The optical fiber ribbons 5 and 105 are intermittent connection type ribbons, and the ratio of the total adhesion lengths to which the adhesive resin is applied to the total length between all the optical fibers per unit length of the optical fiber ribbons 5 and 105 is 40% or more. Accordingly, the rigidity of the optical fiber ribbons 5 and 105 is sufficiently ensured. Accordingly, even when the optical fiber cable 1A is bent and deformed, the optical fiber ribbons 5 and 105 are less likely to be deformed.

With the above configuration, it is possible to input a high-output optical signal, and to provide an optical fiber cable suitable for long distance transmission.

The intermittent connection portion 108 may be provided for every two fibers in the optical fiber ribbon 105. When the optical fiber ribbon 105 is the two-fiber intermittent connection type optical fiber ribbon 105, since the length of the optical fibers to which the adhesive resin is applied and which are connected to each other is long, and the rigidity of the optical fiber ribbon 105 is further increased, it is easy to maintain good transmission characteristics in the optical fiber cable 1A.

The optical fiber ribbons 5 and 105 may be configured such that the ratio of the total adhesion length to which the adhesive resin is applied to the total length between all the optical fibers is 73% or more. At this time, since the rigidity of the optical fiber ribbons 5 and 105 is further increased, it is easy to maintain good transmission characteristics in the optical fiber cable 1A. When the ratio of the total adhesion lengths is too high, the transmission loss is deteriorated, and thus the ratio of the total adhesion lengths is preferably 85% or less.

Second Embodiment

Figure 5:
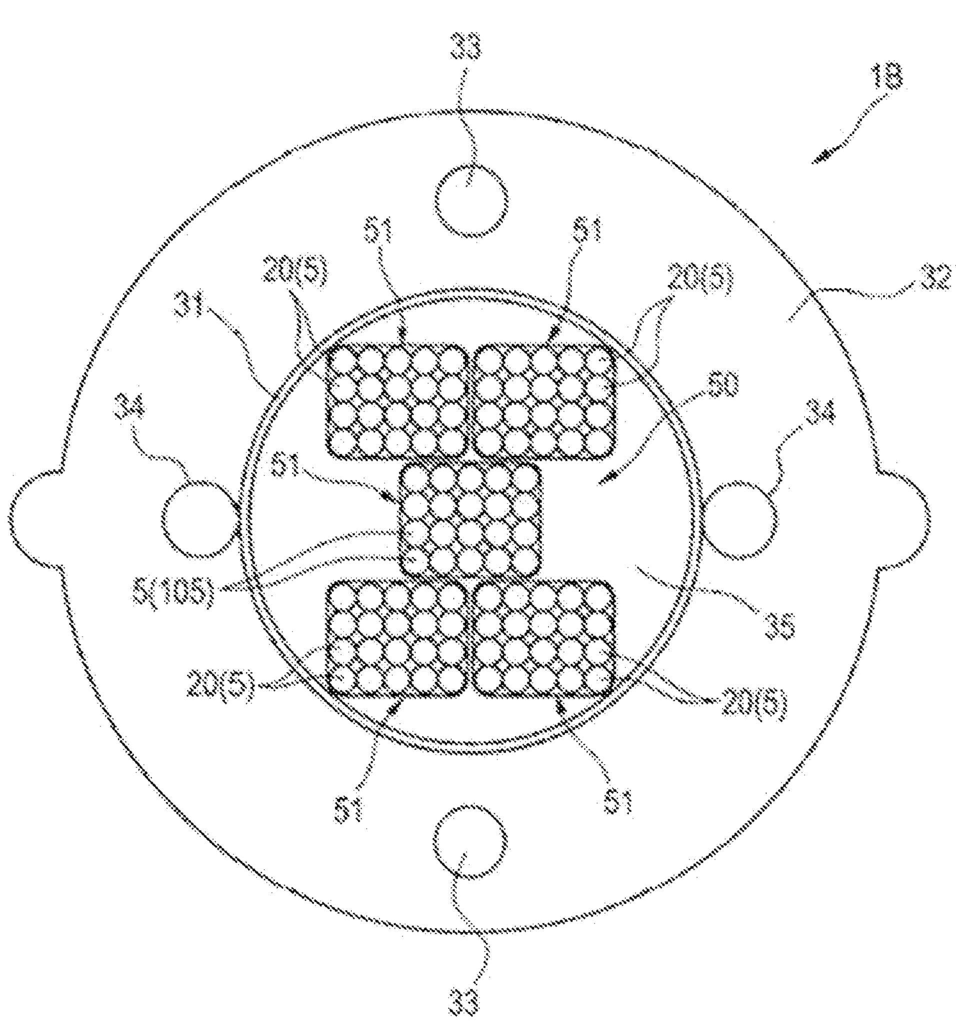
FIG. 5 is a cross-sectional view illustrating an optical fiber cable according to a second embodiment.

The present disclosure is also applicable to a slotless type optical fiber cable. FIG. 5 is a cross-sectional view of a slotless type optical fiber cable 1B.

As illustrated in FIG. 5, the optical fiber cable 1B includes a cable core 50 formed by twisting a plurality of optical fiber ribbons 5, a press-wrapping tape 31 provided around the cable core 50, and a cable jacket 32 covering a periphery of the press-wrapping tape 31. Tension members 33 are provided in the cable jacket 32 along a longitudinal direction of the optical fiber cable 1B. Further, rip cords 34 are provided in the cable jacket 32 along the longitudinal direction of the optical fiber cable 1B. In the second embodiment, the internal space corresponds to a space inside the cable jacket 32.

The cable core 50 of the present example is formed by twisting a plurality of (five in the present embodiment) optical fiber units 51 in which five optical fiber ribbons 5 with four fibers are stacked and bundled. Accordingly, the optical fiber cable 1B of the present example is a 100-fiber slotless type cable in which the cable core 50 including the five optical fiber units 51 is accommodated in the internal space 35 formed inside the cable jacket 32 and the press-wrapping tape 31. The accommodation form of the optical fiber ribbon 5 accommodated in the cable jacket 32 is not limited to a form in which a plurality of the optical fiber ribbons are stacked. For example, the optical fiber ribbon 5 may be rolled so as to be bent in a width direction and further a plurality of the optical fiber ribbons 5 may be twisted so as to be accommodated.

The optical fiber ribbons 5 forming the cable core 50 have the same configuration as the optical fiber ribbons 5 described in the first embodiment. The optical fibers 20 constituting the optical fiber ribbon 5 also have the same configuration as the optical fibers 20 described in the first embodiment. The optical fiber ribbon forming the cable core 50 may be the two-fiber intermittent connection type optical fiber ribbon 105. In the optical fiber cable 1B, an occupancy ratio of the total cross-sectional area of the optical fiber ribbons 5 with respect to a cross-sectional area of the internal space 35, that is, a value calculated by "the total cross-sectional area of the optical fiber ribbons accommodated in the internal space"/"the cross-sectional area of the internal space" is designed to be 30% or more and 40% or less as in the optical fiber cable 1A of the first embodiment.

Also in the optical fiber cable 1B of the second embodiment, as in the first embodiment, it is possible to input a high-output optical signal, and to provide an optical fiber cable suitable for long distance transmission.

Experimental Example

The slotless type optical fiber cable 1B will be described below by way of specific experimental examples. In the experimental example, the optical fiber ribbon 5 formed by using four optical fibers 20 having an effective cross-sectional area of 110 $\mu m^2$ at a wavelength of 1550 nm was accommodated in the optical fiber cable 1B, and a plurality of samples having different occupancy ratios (the cross-sectional area of ribbons/the cross-sectional area of the internal space) and adhesion length ratios of the optical fiber ribbon 5 with respect to the space inside the cable jacket 32 were prepared. Further, a sample in which the optical fiber ribbon was of the one-fiber intermittent connection type and a sample in which the optical fiber ribbon was of the two-fiber intermittent connection type were used. For these samples, a relationship between each parameter and the transmission loss of the optical fiber cable was evaluated.

Evaluation results are illustrated in Table 1. The transmission loss indicates a transmission loss value of signal light having a wavelength of 1550 nm for the optical fiber 20. The temperature characteristic of the transmission loss at −30° C. to +70° C. (an increase value a of the transmission loss) is also illustrated. In general, $\alpha$ is required to be 0.15 dB/km or less.

In the determination of the transmission loss, A to C are evaluated for each sample number. Evaluation A is assigned to a sample that satisfies a transmission loss of 0.21 dB/km or less, which is a standard for application to a low transmission loss cable for long distance transmission. Evaluation B is assigned to a sample that does not satisfy the standard for application to a low transmission loss cable for long distance transmission, but satisfies a standard required for a general cable and a transmission loss of 0.25 dB/km or less. Evaluation C is assigned to a sample that does not satisfy the standard required for a general cable.

As illustrated in Table 1, in optical fiber cables of sample numbers No. 1 to No. 3, that is, the optical fiber cables in which the occupancy ratio of the optical fiber ribbon was 45%, the transmission loss was larger than 0.25 dB/km, and the quality determination of the transmission loss was Evaluation C. In contrast, in optical fiber cables of sample numbers No. 4 to No. 9, that is, the optical fiber cables in which the occupancy ratio of the optical fiber ribbon was 40% or less, the transmission loss was 0.25 dB/km or less at most, and the quality determination of the transmission loss was either Evaluation A or Evaluation B. It was confirmed that when the adhesion length ratio was 40% or more, the transmission loss decreased as the occupancy ratio of the optical fiber ribbon decreased. However, when the occupancy ratio does not reach 30%, the quality determination of the transmission loss can be satisfactorily maintained, but the density of the optical fiber ribbon 5 cannot be increased.

Regarding the optical fiber cables of sample numbers No. 4 to No. 9, a description will be given by paying attention to every certain number of fibers for which the intermittent connection portion is provided. Although the occupancy ratio of the optical fiber ribbons of each of the optical fiber cables of the sample numbers No. 4 to No. 6 is 40%, the optical fiber cable of the sample number No. 4 is the one-fiber intermittent connection type optical fiber ribbon, and the optical fiber cables of the sample numbers No. 5 and No. 6 are each the two-fiber intermittent connection type optical fiber ribbon. At this time, it was confirmed that the optical fiber cables of sample numbers No. 5 and No. 6 had a lower transmission loss than the optical fiber cable of sample number No. 4. That is, the determination of the transmission loss of the optical fiber cable of the sample number No. 4 was Evaluation B, but the determination of the transmission loss of the optical fiber cables of the sample numbers No. 5 and No. 6 was Evaluation A.

Similarly, the occupancy ratio of the optical fiber ribbons of each of the optical fiber cables of the sample numbers No. 7 to No. 9 is 35%, but the optical fiber cable of the sample number No. 7 is the one-fiber intermittent connection type optical fiber ribbon, and the optical fiber cables of the

TABLE 1

| Sample No. | Occupancy ratio of optical fiber ribbon [%] | Intermittent connection pattern | Pitch p [mm] | Adhesion length a [mm] | Non-adhesion length c [mm] | Adhesion length ratio [%] | Transmission loss [dB/km, λ = 1550 nm] | Temperature characteristic [dB/km] | Determination of transmission loss |
|---|---|---|---|---|---|---|---|---|---|
| 1 | 45 | Intermittent for every one fiber | 100 | 40 | 60 | 40 | 0.547 | 0.182 | C |
| 2 | 45 | Intermittent for every two fibers | 150 | 30 | 120 | 73 | 0.522 | 0.172 | C |
| 3 | 45 | Intermittent for every two fibers | 200 | 80 | 120 | 80 | 0.518 | 0.167 | C |
| 4 | 40 | Intermittent for every one fiber | 100 | 40 | 60 | 40 | 0.216 | 0.064 | B |
| 5 | 40 | Intermittent for every two fibers | 150 | 30 | 120 | 73 | 0.206 | 0.044 | A |
| 6 | 40 | Intermittent for every two fibers | 200 | 80 | 120 | 80 | 0.203 | 0.036 | A |
| 7 | 35 | Intermittent for every one fiber | 100 | 40 | 60 | 40 | 0.195 | 0.055 | A |
| 8 | 35 | Intermittent for every two fibers | 150 | 30 | 120 | 73 | 0.188 | 0.049 | A |
| 9 | 35 | Intermittent for every two fibers | 200 | 80 | 120 | 80 | 0.185 | 0.045 | A |

sample numbers No. 8 and No. 9 are each the two-fiber intermittent connection type optical fiber ribbon. At this time, there was no difference in the determination of the transmission loss, but it was confirmed that the transmission loss was reduced in the optical fiber cables of sample numbers No. 8 and No. 9 compared to the optical fiber cable of sample number No. 7.

From this, it was confirmed that in the optical fiber ribbon, the transmission loss was reduced in the two-fiber intermittent connection type optical fiber ribbon as compared with the one-fiber intermittent connection type optical fiber ribbon.

Regarding the optical fiber cables of sample numbers No. 4 to No. 9, a description will be given by paying attention to the adhesion length ratio. The occupancy ratio of the optical fiber ribbons of each of the optical fiber cables of sample numbers No. 4 to No. 6 is 40%, but the adhesion length ratio of the optical fiber cable of sample number No. 4 is 40%, the adhesion length ratio of the optical fiber cable of sample number No. 5 is 73%, and the adhesion length ratio of the optical fiber cable of sample number No. 6 is 80%. At this time, it was confirmed that the larger the adhesion length ratio of the sample, the lower the transmission loss. That is, the determination of the transmission loss of the optical fiber cable of the sample number No. 4 was Evaluation B, but the determination of the transmission loss of the optical fiber cables of the sample numbers No. 5 and No. 6 was Evaluation A.

Similarly, the occupancy ratio of the optical fiber ribbons of each of the optical fiber cables of sample numbers No. 7 to No. 9 is 35%, but the adhesion length ratio of the optical fiber cable of sample number No. 7 is 40%, the adhesion length ratio of the optical fiber cable of sample number No. 8 is 73%, and the adhesion length ratio of the optical fiber cable of sample number No. 9 is 80%. At this time, there was no difference in the determination of the transmission loss, but it was confirmed that the larger the adhesion length ratio of the sample, the lower the transmission loss.

Accordingly, it was confirmed that the transmission loss was further reduced when the adhesion length ratio was 73% or more.

Although the present disclosure has been described in detail with reference to specific embodiments, it is apparent to those skilled in the art that various changes and modifications can be made without departing from the spirit and scope of the present disclosure. In addition, the number, positions, shapes, and the like of the constituent members described above are not limited to the embodiments described above, and can be changed to the number, positions, shapes, and the like suitable for carrying out the present disclosure.

REFERENCE SIGNS LIST

1A, 1B: optical fiber cable
5, 105: optical fiber ribbon
6, 106: connection portion
7, 107: non-connection portion
8, 108: intermittent connection portion
10: slot rod
11, 11*a*, 11*b*, 11*c*, 11*d*, and 11*e*: slot groove (example of internal space)
12, 33: tension member
14, 31: press-wrapping tape
16: jacket
18: position identification mark
20: optical fiber
21: core portion
22: cladding portion
23: glass fiber
24: primary coating layer (primary resin)
25: secondary coating layer (secondary resin)
26: colored layer
32: cable jacket
34: rip cord
35: internal space
50: cable core
51: optical fiber unit

What is claimed is:

1. An optical fiber cable in which an optical fiber ribbon formed by arranging a plurality of optical fibers in parallel is mounted in an internal space, wherein a core portion of the optical fiber is made of pure silica glass, and an effective cross-sectional area of the core portion at a wavelength of 1550 nm is 110 $\mu m^2$ or more and 150 $\mu m^2$ or less, wherein the optical fibers constitute an intermittent connection type optical fiber ribbon including an intermittent connection portion in which a connection portion to which an adhesive resin is applied and a non-connection portion to which the adhesive resin is not applied are alternately provided between adjacent optical fibers, wherein the optical fiber ribbon has a ratio of a total adhesion length to which the adhesive resin is applied to a total length between all the optical fibers of 73% or more per a unit length of the optical fiber ribbon, and wherein an occupancy ratio of the optical fiber ribbon to a cross-sectional area of the internal space is 30% or more and 40% or less.

2. The optical fiber cable according to claim 1, wherein the intermittent connection portion is provided for every two fibers in the optical fiber ribbon.

3. The optical fiber cable according to claim 1, wherein the optical fiber cable is a ribbon slot type optical fiber cable having a slot rod.

4. The optical fiber cable according to claim 1, wherein the optical fiber cable is a slotless type optical fiber cable including a cable core formed by twisting a plurality of the optical fiber ribbons and a cable jacket provided around the cable core.

* * * * *